(12) United States Patent　(10) Patent No.:　US 6,247,492 B1
Stuart　(45) Date of Patent:　Jun. 19, 2001

(54) OVERFILL PROTECTION FOR FUEL TANKS

(75) Inventor: Graham M. Stuart, Surrey (GB)

(73) Assignee: W & J Risbridger Limited (GB)

( * ) Notice: Subject to any disclaimer, the term of this patent is extended or adjusted under 35 U.S.C. 154(b) by 0 days.

(21) Appl. No.: 09/423,598

(22) PCT Filed: May 12, 1998

(86) PCT No.: PCT/GB98/01350

§ 371 Date: Nov. 10, 1999

§ 102(e) Date: Nov. 10, 1999

(87) PCT Pub. No.: WO98/51610

PCT Pub. Date: Nov. 19, 1998

(30) Foreign Application Priority Data

May 12, 1997 (GB) .................................................. 9709587

(51) Int. Cl.[7] .................................................. F16K 31/34
(52) U.S. Cl. .......................................... 137/413; 137/588
(58) Field of Search ..................................... 137/413, 588

(56) References Cited

U.S. PATENT DOCUMENTS 4,423,750 * 1/1984 Morizumi et al. .................... 137/413
6,138,709 * 10/2000 Home ................................... 137/413

* cited by examiner

Primary Examiner—Kevin Lee
(74) Attorney, Agent, or Firm—Andrus, Sceales, Starke & Sawall

(57) ABSTRACT

A fuel storage tank is disclosed which is fitted with an overfill protection device for automatically shutting off flow of fuel into the tank when the fuel reaches an intended maximum fill level. The overfill protection device comprises a fill valve located in a fuel fill tube and linked to a diaphragm or piston which is displaceable within a chamber, said chamber communicating with an aperture which is arranged to vent the chamber into the tank. The device may include a float valve for controlling the aperture and maintaining the aperture closed until fuel in the tank reaches a predetermined fill level, whereupon the aperture is opened and the piston or diaphragm is displaced to cause closure of the valve.

10 Claims, 9 Drawing Sheets

OVERFILL PROTECTION FOR FUEL TANKS

FIELD OF THE INVENTION

This invention relates to fuel storage tanks and in particular provides an arrangement for automatically shutting off the incoming flow of fuel when the fuel tank is essentially full, thereby preventing overfilling and loss of fuel.

BACKGROUND OF THE INVENTION

In our co-pending UK Application No. 9619580.5, (Publication No. 2317382), an overfill protection device (OPD) for fuel tanks is disclosed. One embodiment described in our co-pending application includes a butterfly or sleeve-type fill valve which is positioned in the fuel fill line and is controlled by a diaphragm or piston. Air in the fill line is allowed to bleed into the ullage through a valve controlled by a float during a normal filling stage. However, when the tank is almost full, e.g. about 95% full, the bleed line is shut off. This causes pressure to rise in a chamber on one side of the piston or diaphragm, resulting in movement of the piston or diaphragm which movement is transmitted to and closes the fill valve. While the constructions described in our above application function satisfactorily, the arrangement is complicated and requires a significant number of seals.

SUMMARY OF THE INVENTION

It is an object of this invention to provide an overfill prevention system which is less complex and can be operated with no dynamic seals for extended operational life.

According to one aspect of the present invention there is provided a fuel storage tank having an overfill protection device (OPD) for shutting off flow of fuel into the tank when the amount of fuel in the tank reaches an intended maximum fill level, said OPD including a fill valve located in or connected to a fuel fill tube and linked to a piston or diaphragm, which is displaceable in a chamber, said chamber communicating with an aperture which is arranged to vent the chamber into the tank when said aperture is open to cause displacement of the piston or diaphragm and the consequential closure of the fill valve, said aperture being controlled by a vent valve which normally maintains said valve closed, but is linked to fuel level sensing means for sensing when the level of fuel in the tank reaches said intended maximum fill level and causing said vent valve to open.

According to one form of the invention there is provided a fuel storage tank having an overfill protection system for shutting off flow of fuel into the tank when the amount of fuel in the tank reaches an intended maximum fill level said overfill protection system including a fill valve located in a fuel fill tube and linked to a diaphragm or piston, which is displaceable in a chamber, said chamber communicating with an aperture within the ullage above said maximum fill level, and a float valve for controlling said aperture and maintaining said aperture closed until fuel in the tank reaches a predetermined fill level whereupon the aperture is opened and the piston or diaphragm is displaced to cause closure of the fill valve.

Fuel storage tanks are commonly replenished by connection to a road tanker and filled by gravity from the road tanker. As a consequence, during the filling procedure, the pressure in the fill line leading from the tanker to the fill or drop tube is greater than the pressure in the tank ullage by an amount approximately equal to the hydrostatic pressure of the tank fuel level above the drop tube exit. When the fill valve is closed, pressure is equal to the hydrostatic pressure of the road tanker above the fill valve. The piston is preferably spring-biased with a light spring so that the piston is in its retracted position and the fill valve is normally in the open position. Alternatively, the fill valve may be separately spring-biased into its closed position but only to the extent that it is opened by flow of fuel into the drop tube.

When the float valve opens, the difference in pressure between the fill line and the ullage is sufficient to move the piston and cause closure of the fill valve. The fill valve is preferably a butterfly valve or a sleeve valve or other valve which will move easily between its open and closed position. A butterfly valve meets these requirements because there is equal pressure on each side of the valve. However, a poppet valve may also be employed, especially if it is lightly spring-biased towards the closed position.

In contrast with the overfill prevention device (OPD) described in our above co-pending application, a piston seal is unnecessary in the OPD of the present invention. The annular gap between the piston and cylinder wall acts as a balance orifice with significantly less area than the open float valve orifice and test valve orifice. When the test valve or float valve is opened during filling, a pressure imbalance across the piston is generated causing the piston to rise against a light spring biasing the butterfly valve into its closed position. When the piston reaches its full travel it is sealed against the cylinder cap preventing further flow through the float valve. Also, it is unnecessary to provide an elastomer seal between the butterfly valve and its seat because a small leak at this point will not matter.

In practice, the fuel will be flowing during normal peak filling at about 1000 liters per minute and closure of the fill valve will reduce the flow to about 1% or less.

Closure of the fill valve will be immediately apparent to the road tanker driver, since the sudden closure will give a kick to the delivery hose and he will then know that the tank is fill and will shut off the supply valve at the tanker.

An important feature of the system of the invention is that the operation of the fill valve can be readily tested by providing a test valve in the line communicating the cylinder with the float valve. If the test valve at this point is open with a positive hydrostatic pressure within the fill line, the fill valve will immediately operate. Also, failure of the interconnecting hose or other conduit between the fill valve and float valve will cause the fill valve to close to provide a fail safe condition.

In a modified form of the invention, it is possible to dispense with the float valve and instead control the vent valve by means of electrical control means. This arrangement has the advantage that the OPD can be located entirely within the drop tube or crane T-piece and no other connections need be made to the tank. In this form of the invention, the aperture for venting pressure from the chamber may be closed by an electrically operated vent valve which may be actuated to vent pressure into the tanks e.g. through a tubular valve stem into the drop tube below the fill valve.

During the filling of a fuel tank, it is highly desirable to be able to reduce tank fluid turbulence. The main benefit from reduction of turbulence is that there will be less disturbance of the heavy fuel vapour layer on top of the liquid fuel, and this will consequently reduce vapour line fuel losses.

Normally, the fill tube into a fuel tank terminates just short of the base of the tank and is cut off at approximately a 45 degree angle, and may terminate, for example, about 6 inches above the tank base. Turbulence is particularly a problem during the initial stage of the fill cycle when the air in the connecting pipes from the tanker is driven down the fill tube by the incoming fuel. This initial "slug of air" rebounds off the tank bottom and produces a large concentration of air bubbles causing a break up of the normal vapour layer.

Another aspect of the invention seeks to reduce such turbulence by fitting a diffuser to the delivery end of the fill or drop tube.

According to a further aspect of the invention, therefore, there is provided a fill or drop tube for a fuel storage tank in which the delivery end of the drop tube is closed by a diffuser having apertures which cause fuel emitted from the drop tube to exit therefrom under substantially laminar flow conditions.

The exit aperture or apertures from the diffuser are preferably defined by two or more substantially parallel plates arranged substantially at right angles to the longitudinal axis of the drop tube. Conveniently, the apertures are formed from a series of spaced washers attached to the end of the drop tube.

The diffuser of the present invention may be used with any drop tube for a fuel storage tank. It may be used with particular advantage in conjunction with an air transfer valve designed to bleed off air entering the fill line into the ullage. Air transfer valves for this purpose are described in our co-pending British patent application No. 9808483.3. The OPD of the present invention may also be used in fuel storage tanks in conjunction with an air transfer valve as described in British patent application No. 9808483.3.

The diffuser of the invention may also be used in conjunction with the overfill protection system described above.

Preferred aspects of the present inventions will now be described with reference to the accompanying drawings, in which:

DETAILED DESCRIPTION OF THE DRAWINGS

Figure 1:
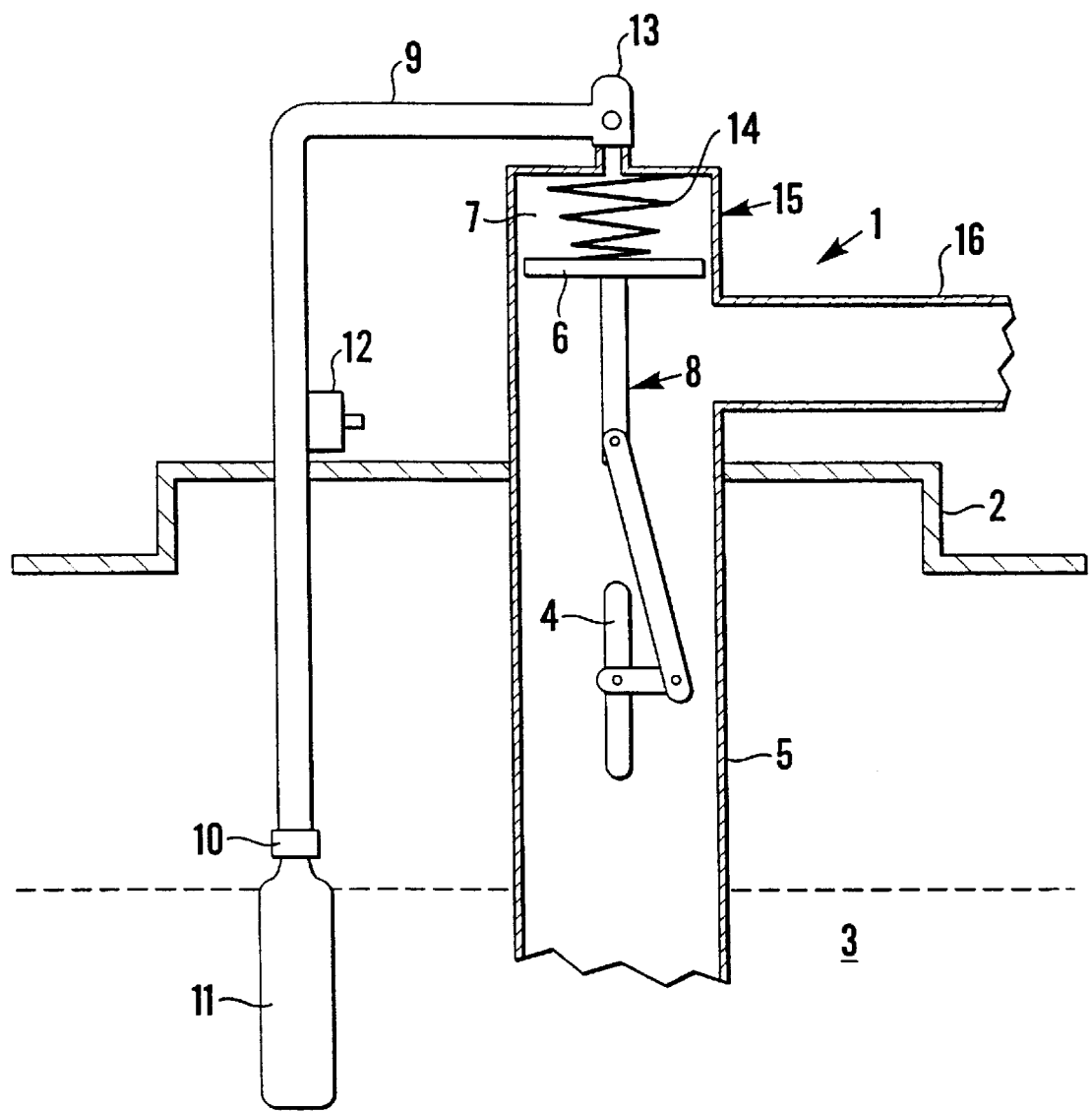
FIG. 1 is a diagrammatic illustration of the overfill protection system fitted into the fill line of a fuel storage tank.

Referring first to FIG. 1, the overfill prevention system generally indicated at 1 in FIG. 1, is fitted into the manhole cover 2 of a fuel tank 3. The overfill prevention device (OPD.) comprises a fill valve 4, which in the embodiment schematically illustrated is a butterfly valve located within the fill or drop tube 5. The fill valve 4 has an operating mechanism comprising a piston 6 arranged to move in a cylinder 7 and a linkage 8 for transmitting movement of the piston to the fill valve 4. Cylinder 7 is connected by a conduit 9 to a float valve 10, which is normally in the closed position, but is opened when fuel reaches the maximum intended fill level, normally indicated by the broken line in FIG. 1, normally equivalent to 95% of the contents of the tank.

Conduit 9 also includes a test valve 12 located at a convenient position outside the tank. Manual operation of the test valve opens the conduit 9 to the ullage space or to atmosphere and enables the operation of the fill valve 4 to be tested. Between the cylinder and float valve 10 is located a non-return valve 13, arranged to prevent fluid flow from the ullage space into the drop tube. Conveniently, this is located adjacent to the cylinder 7.

Piston 6 is preferably spring-biased into the position shown in FIG. 1, e.g. with a light spring 14, so that the piston 6 is retracted and the valve 4 is normally in the open position. However, the weight of the piston and associated linkage may provide this function. Alternatively, the flow of fuel into the drop tube may be sufficient to move the valve into the open position.

Figure 2:
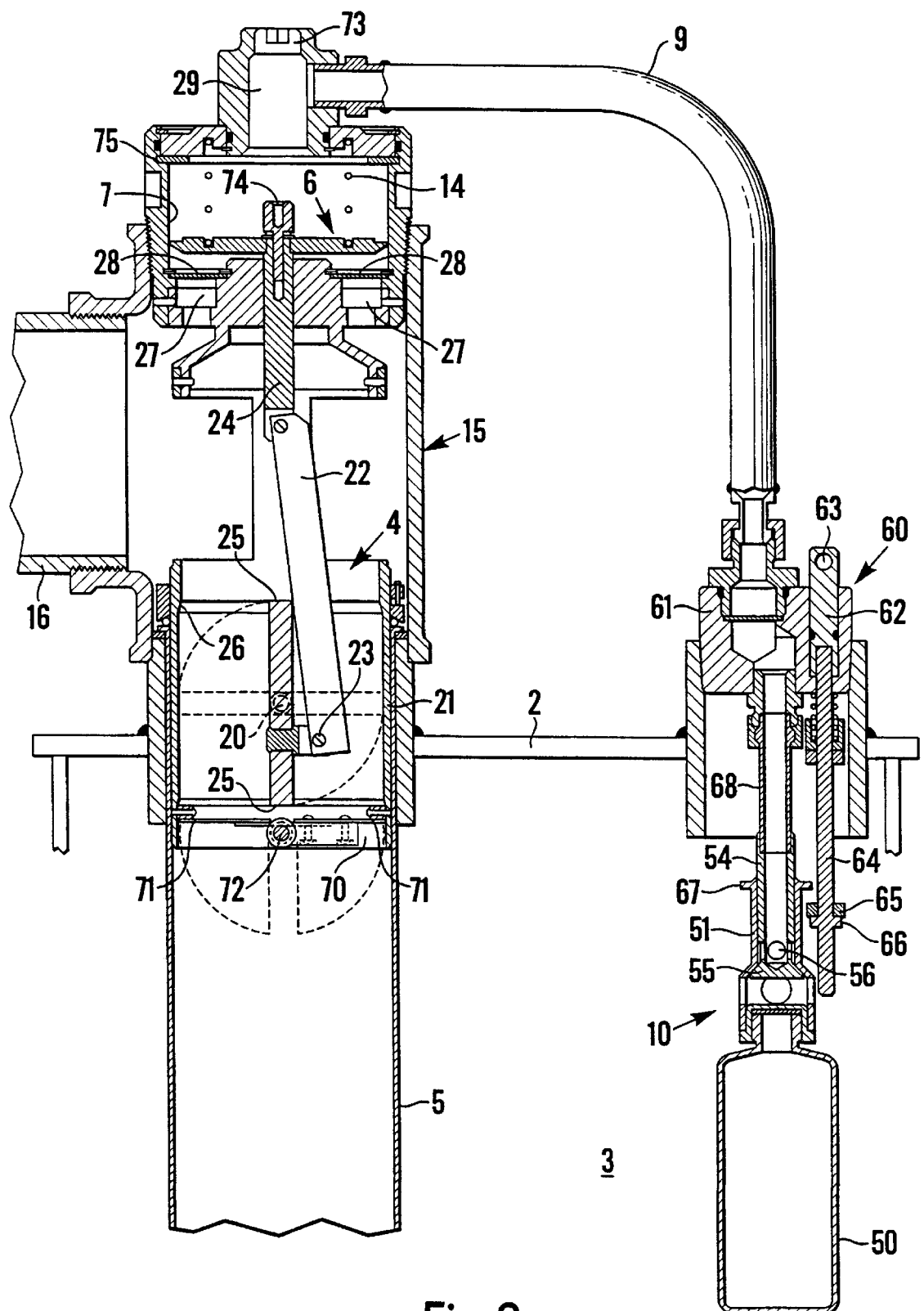
FIG. 2 is a sectional view of a first embodiment of an overfill protection system in accordance with the invention, showing the fill valve and operating piston connected to the float and float valve.
Figure 3:
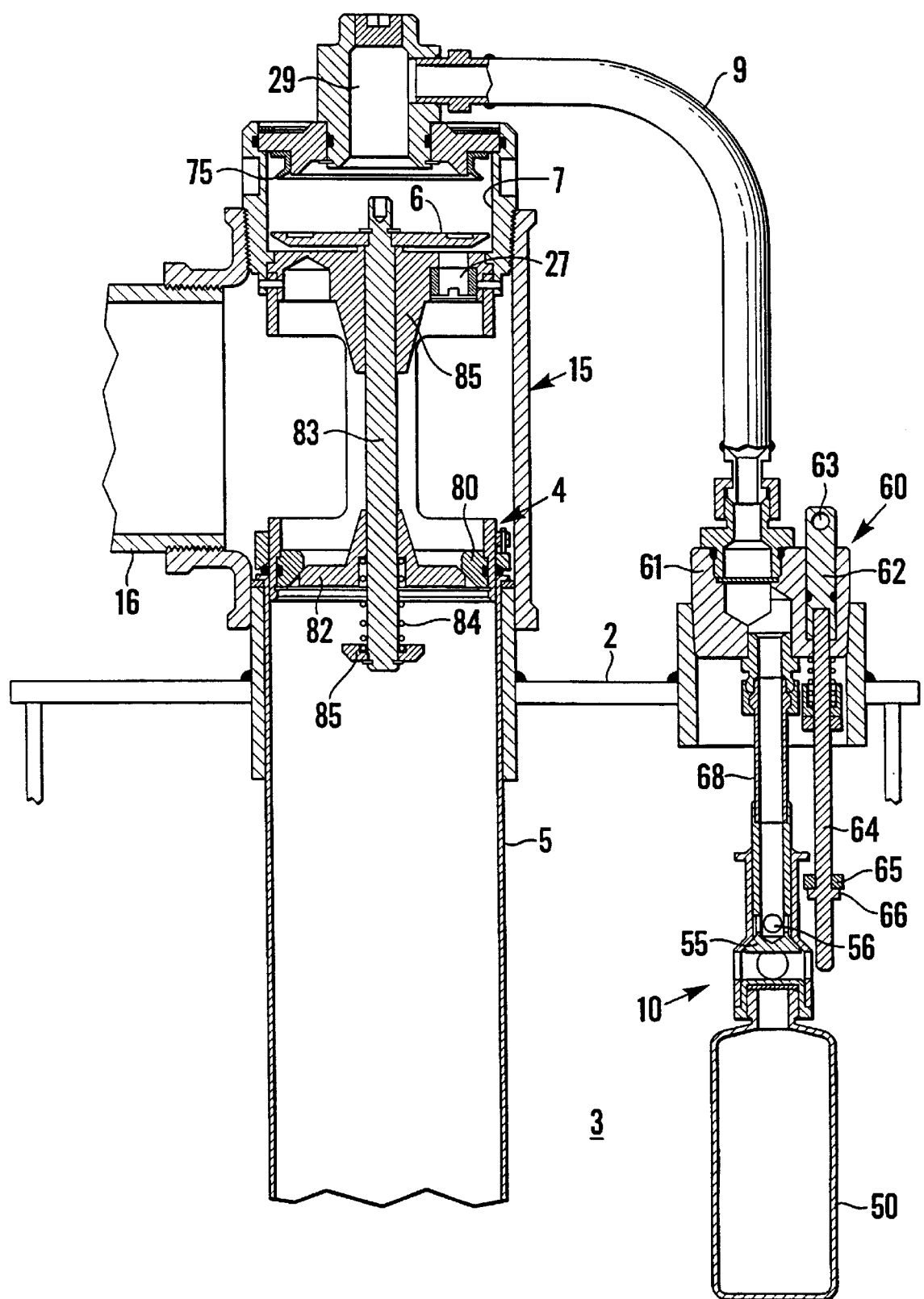
FIG. 3 is a section through a second embodiment of an overfill protection system in accordance with the invention showing the fill valve, operating piston connected to the float and float valve.

Details of the construction of two embodiments of the fill valve and float valve are shown in FIGS. 2 and 3. As shown in FIG. 2. the fill valve, generally indicated at 4 and its associated operating piston 6, can be fitted into the drop tube 5 and the Crane T-junction 15, which is normally present in conventional fuel storage tanks.

As can be seen from FIG. 2, the fill valve 4 comprises a butterfly valve pivoted at 20 in a tubular fitting 21, which is dimensioned to fit within the drop tube 5. Closure of the fill valve 4 is effected by upward movement of a link arm 22, connected by a pivot point 23 to the connecting rod 24 of piston 6. Piston 6 moves within a cylinder 7 and is biased into the position shown in FIG. 2 by spring 14. Valve vane 4 is not a sealing fit in tube 21 since a seal is not necessary for the valve to perform its function and a seal would restrict the movement of the valve vane 4. As can be seen, the fill valve vane 4 has rounded ends 25 which co-operate with a chamfered surface 26 on one end of the tube 21. The pivot axis 20 is preferably aligned with the piston rod 24 to ensure smooth and rapid closure.

Cylinder 7 communicates with the space in the T-piece 15 via passages 27 which are protected with flame-arresting grids 28. A port 29 communicates with a conduit 9 leading to the float valve 10. A non-return valve 13 (indicated schematically in FIG. 1) may be located adjacent the port 29 to prevent flow from the ullage into the cylinder 7. The non-return valve may, for example, comprise a ball normally resting in a valve seat, and may be present at any convenient point between the port 29 and the float valve. Air or vapour under pressure is able to lift the non-return valve and pass along conduit 9, but any back pressure which may be developed in the ullage is prevented by the non-return valve from causing fluid to pass in the opposite direction.

Details of the float valve and the test valve are shown in the right-hand part of FIG. 2.

A float 50 is mounted on the lower end of a tube 51, having an enlarged portion 52 containing apertures 53. Tube 51 slides on an inner tube 54 which terminates with a conical solid end 55. Inner tube 51 is provided with apertures 56, which are normally covered by the tube 51 when the float is in the position shown in FIG. 2. Once the level of fuel within the tank reaches a position where it begins to lift the float 50, tube 51 will be raised on the inner tube 54, and this will effectively open the communication between aperture 56 and apertures 53. Air, vapour or fuel will then be able to flow from the cylinder 7 along conduit 9, tube 54 and out into the ullage of the tank. When the piston reaches the top of its upward travel, its upper rim seats against a seal 75. This prevents any vapour or liquid fuel from flowing into the conduit 9.

Mounted above the tube 54 is a mechanism 60 for testing valve 10. Testing mechanism 60 has a port 61 which communicates with the ullage. This port is normally closed by valve 62, but can be opened for test purposes by depressing stem 63, thereby providing a communication between passage 64 and port 61. Since passage 64 is connected to conduit 9, the cylinder 7 will be in communication with the ullage. Valve 62 is spring-biased into its closed position so that once stem 63 is released, the port 61 is then closed.

Testing mechanism 60 comprises a body member 61 in which a bore is formed for receiving an operating rod 62. Rod 62 has a hole 63 at one end and a threaded extension 64 which carries an abutment 65 fastened by a nut 66. Abutment 65 is positioned in relation to tube 51 so that when rod 62 is lifted, e.g. by placing a hook in hole 63 and lifting the hook, abutment engages a protrusion 67. This has the effect of manually opening the valve 10 and connecting the cylinder 7 with the ullage and thus causing the piston to move upwardly, thereby testing the operation of the fill valve.

Body member 61 also provides a cylindrical block which can be fitted to a tubular port in the top of the tank and a chamber for connecting the conduit 9 and a tube 68, leading to the inner tube 54.

The OPD. operates in the following manner. The road tanker delivery pipe will be connected to incoming branch conduit 16, and fuel will then be delivered to the tank 3 via the drop tube 5. Because of the hydrostatic pressure of fuel delivered from the tanker, the pressure within the drop tube 5 and the Crane piece 15 will be higher than that within the ullage of the tank. Air, vapour or fuel will be able to leak past the piston 7 and pressurise the line 9, but no movement of the piston will take place because the conduit 9 is closed at the other end by the float valve 10.

When the tank reaches about 95% of its filled capacity, float 11 will begin to rise and this will open valve 10. The pressure in conduit 9 will suddenly drop and pressure within the fill line will cause piston 6 to suddenly rise and close the valve 4. The tanker driver will notice a sharp kick to the delivery hose, which will then indicate to him that the tank is full, and flow into the tank will essentially stop.

Prior to the delivery, proper operation of the OPD. can be checked by lifting the rod 62, and this will immediately trigger closure of the valve 4.

FIG. 2 shows in dotted lines the position of the vane of the valve 4 in its closed position. Mounted below the vane 4 is a compensator valve 70. This consists of a pair of flaps 71 pivotally mounted on a pivot axis 72 and spring-loaded by a light spring into a closed position, as shown in full lines in FIG. 2. The flaps 71 open under the flow of fuel into the drop tube (as indicated by the broken lines) and ensure that there is a positive pressure in the drop tube.

It will be appreciated that the crane T-piece 15 and the conduit 9 are conveniently located within an inspection pit which is normally protected by a cover plate not shown. For inspection purposes, the cover plate is removed for testing the operation of the OPD by lifting rod 62. When no fuel is being introduced into the storage tank, the movement of the piston and valve can be directly tested using a rod introducible through the port 29. For this purpose, the port may be accessed by removing a nut 73 and attaching one end of a threaded rod to a threaded socket 74 in the end of piston 24, which can then be manually lifted to test the movement of the piston 6 and valve 4.

FIG. 3 shows a second embodiment which essentially differs from that shown in FIG. 2 by utilising a poppet valve as the fill valve 4, and the same reference numerals are used to show equivalent parts. In this embodiment, valve 4 comprises a valve seat 80 which is received within a tubular support 81 located at the upper end of a drop tube 5. A poppet valve 82 is slidably mounted on a valve stem 83 and urged into its closed position by a light spring 84. Valve stem 83 also constitutes at its upper end a piston rod and carries piston 6 attached to its upper end. Rod 83 is slidably supported in a block 85 fixed to the base of cylinder 7. The assembly comprising cylinder 7 and block 85 is fixed into the top of T-piece 15. Block 85 has one or more apertures 27 which are protected with flame-arresting grids 28.

The embodiment of FIG. 3 operates in a similar way to the embodiment of FIG. 2. When fuel delivery pipe 16 is connected to a road tanker and fuel is delivered, the poppet valve opens by sliding downwardly on the stem 83 and compressing the spring 84 until the lower face of valve member 82 rests on abutment 85. When the level of fuel in the tank reaches the intended maximum level, the float is raised and opens the valve 10. This causes the piston to move suddenly upwardly in the cylinder 7, lifting the valve member 82 and closing it against its seat 80. In a similar way to the embodiment of FIG. 2, this sudden closure of the valve 4 imparts a "kick" to the tanker delivery hose and shuts off the main flow of fuel.

Rapid operation of the piston is ensured by proper selection of the relative areas of the piston and the poppet valve. Thus, the area of the piston should be significantly larger than that of the poppet valve, e.g. twice as large. Also, the total area of the aperture in the float valve should be large in order to ensure rapid reduction of pressure in the conduit 9 when the float valve opens. In the case of both embodiments, it is important that the area of the gap between the piston and the cylinder should be small, compared with the area of the orifice in the float valve and also small compared with the area of the ports 27. This has the effect of restricting flow between the piston and cylinder and assists rapid response when the float valve is opened. It will be appreciated that the level at which the float valve operates can be adjusted by providing tubes 68 and 54 with threads so that by rotating tube 54, the float valve assembly can be raised or lowered with respect to the block 61. Also, the position of abutment 65 on threaded rod 64 can be similarly raised or lowered.

Figure 4:
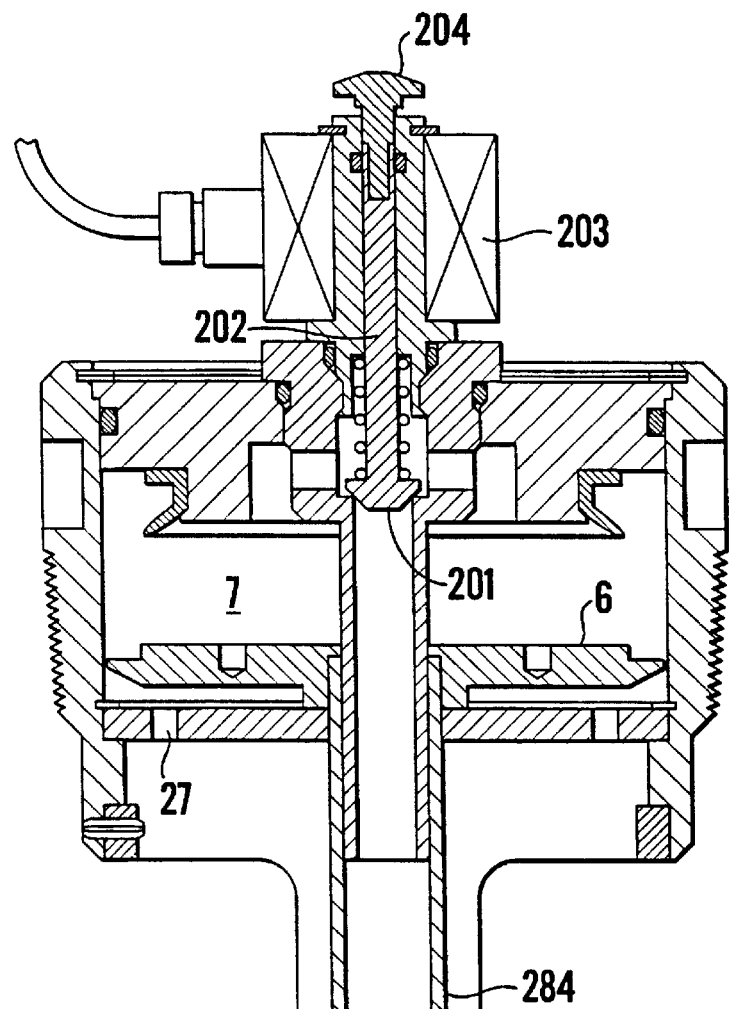
FIG. 4 is a section through a third embodiment of an OPD in accordance with the invention, in which venting of the chamber above the piston is controlled by an electrically actuated valve.
Figure 4:
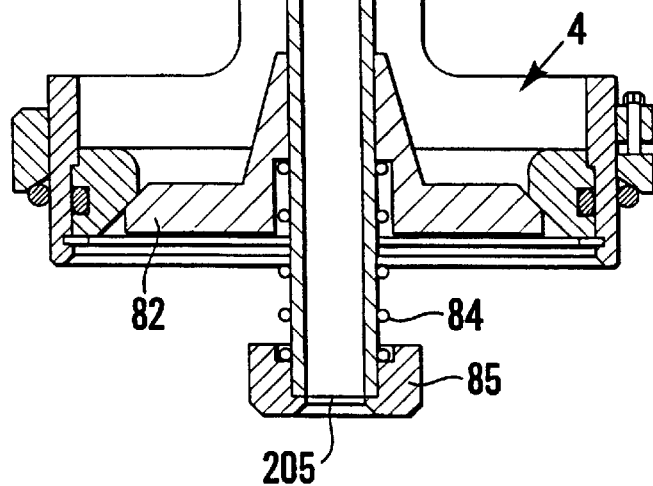

FIG. 4 shows a section through a third embodiment of an OPD in accordance with the invention. The construction of the OPD in this embodiment is similar to that shown in FIG. 3 and the same reference numerals are used to indicate equivalent components. The major difference is that in the embodiment of FIG. 4, the chamber 7 is not connected to a float valve by an external conduit 9. Instead, the chamber 7 communicates with an aperture 201 formed at the top of tubular valve stem 283. Tubular stem 283 is connected to tubular extension guide 284 which carries at its lower end an abutment 85. Poppet valve 82 is carried by stem 284 and it operates in the manner described above in relation to FIG. 3. Aperture 201 is normally closed by valve head 202 which is spring loaded into its closed position. Mounted above the chamber 7 and encircling the stem of valve 202 is an electro-mechanical coil 203 which, when energised with an electrical current, raises valve 202 and thus opens aperture 201. Coil 203 is an intrinsically safe DC coil to BS 5501 standard. Lifting of valve stem 202 causes aperture 201 to open and pressurised fluid in chamber 7 to be vented through the valve stem 284 and out through exit 205 on the tank side of the poppet valve 82. This causes the poppet valve to be lifted onto seat 80, thus shutting off the flow of fuel and indicating to the tanker driver that the storage tank is full or nearly so.

Coil 203 may be energised by an electrical signal from an electronic sensor which senses (e.g. by capacitance measurements) when the tank is almost full.

A likely sequence of operation would be for the coil 203 to be energised in this way when the tank is 95% full. After, say, a timed delay of 30 seconds, the electronic tank gauging equipment may be arranged to de-energise the coil which would permit rapid draining down of the tank contents, after the tanker driver has shut off the delivery valve at the tanker.

The electronic gauging equipment may be also arranged to energise the coil again if the tank level exceeds 97% of the fill level and, perhaps, cause an alarm to be activated. In this case, it may be arranged that the hose can be drained down only via a manual isolator switch.

In FIG. 4, satisfactory operation of the OPD may be tested by lifting the valve stem 202 by means of the button 204.

Figure 5:
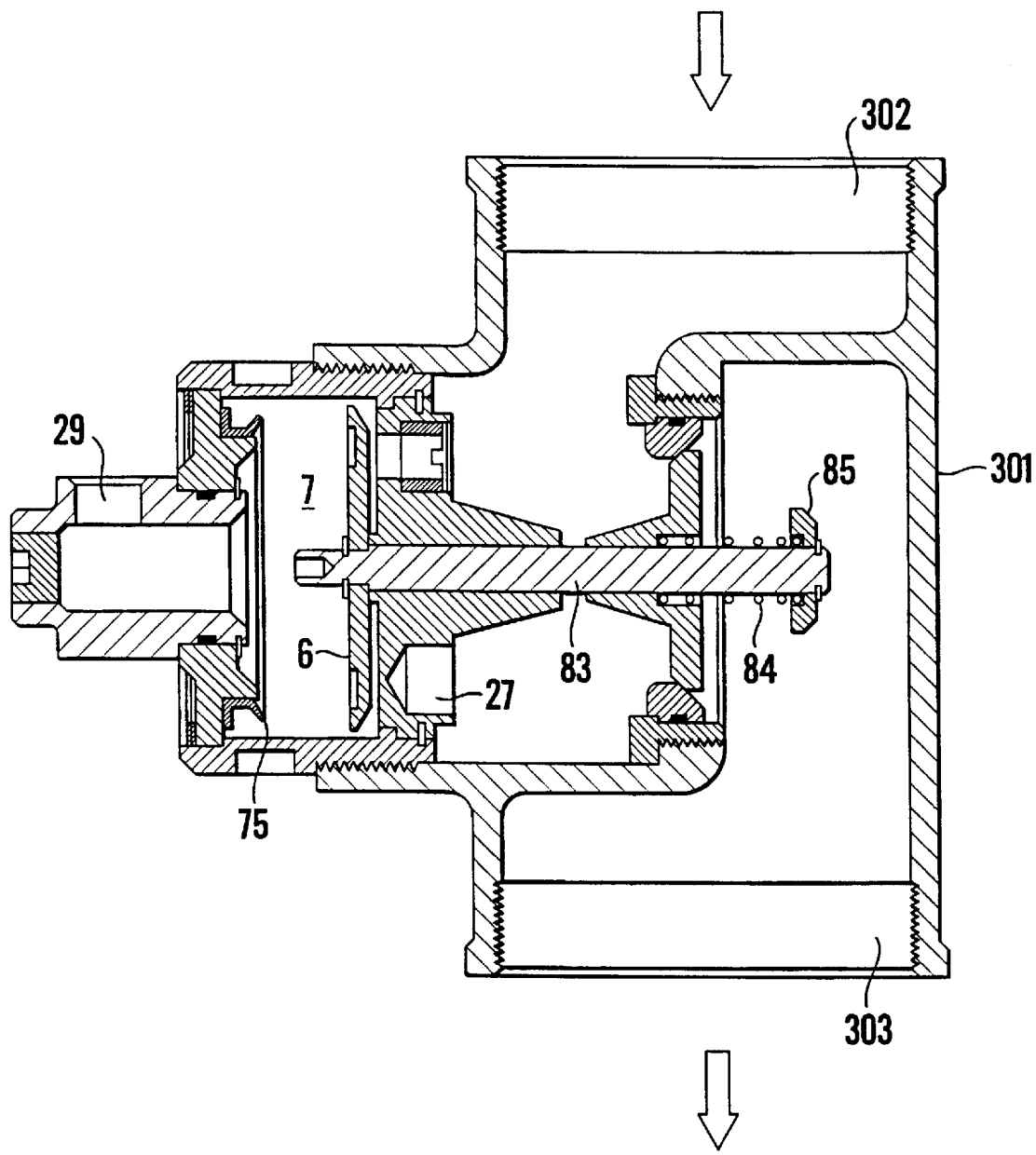
FIG. 5 is a section through a fourth embodiment of an OPD in accordance with the invention, in which the flow of fuel from a tanker is in-line rather than at right angles to the drop tube.

FIG. 5 shows a further modification of the embodiment of FIG. 3, which is adapted for tanks having an in-line fill pipe from the tanker. The construction of the fill valve and operating piston is the same as in FIG. 3, and the same reference numerals are given for equivalent parts and components. Instead of the T-piece 15, the fill valve and piston are housed in an adapted globe valve casing 301. Fuel from the tanker enters through port 302, flows through the fill valve and out through an exit port 303, which is connected to the upper end of the storage tank drop tube. Operation of the fill valve may be by means of a connection to a float valve-controlled aperture through port 29 or by means of an electrically energised coil as in the embodiment of FIG. 4.

Although the embodiments of OPD's illustrated above have been described in relation to gravity fed fuel storage tanks, it is also possible to fill tanks fitted with such OPD's by a pumped fuel supply and in such cases, the tanks may be above ground.

The operation of the diffuser will now be described with references to FIGS. 4 to 6.

Figure 6:
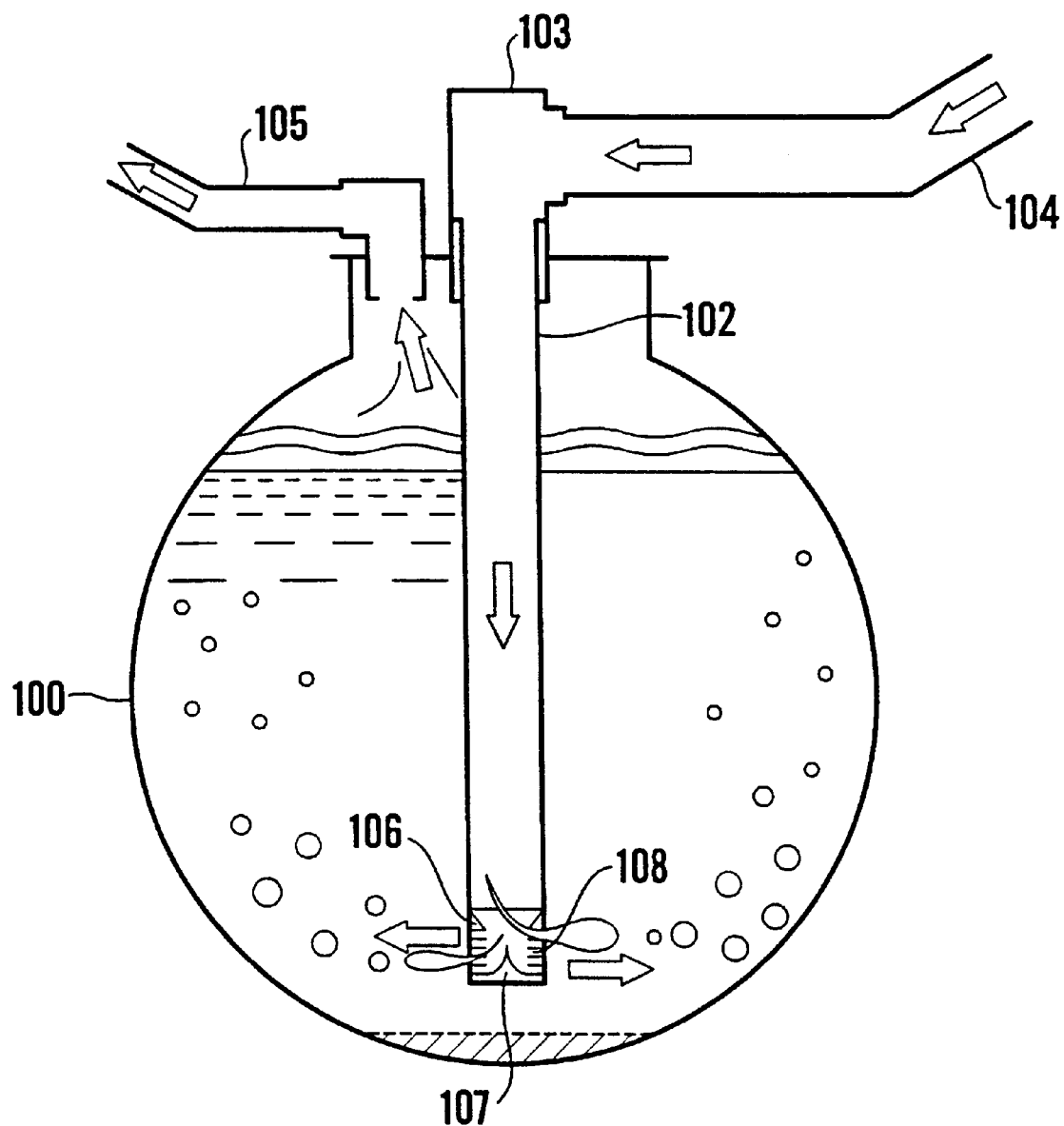
FIG. 6 is a schematic view of a vehicle storage tank showing the fill or drop tube during the initial stage of the fill cycle.

Referring to FIG. 6, this shows a fuel tank 100 fitted with a standard drop tube 102 and crane junction 103. Fuel is delivered from a road tanker via an inlet conduit 104 and passes down the drop tube 102. Conventional drop tubes as shown are cut at an angle of about 45 degrees, so that liquid emanating from the drop tube will tend to strike the bottom of the tank obliquely. In the initial stage of the delivery of fuel, the air initially present in the delivery hose and inlet line 104 will be compressed by the advancing fuel front and this will cause the generation of large air bubbles as illustrated pictorially in FIG. 7. These bubbles and pockets of air rebound off the tank base and break up the top surface of the liquid in the tank, disrupting the normal vapour level and generating large amounts of additional vapour.

The vapour so produced is vented from the tank via the vent line 105. At the same time, the air and liquid moving at relatively high velocity out of the drop tube 102 will disturb sediment at the bottom of the tank, causing this to be suspended in the fuel. Such sediment can cause difficulties not only for vehicles supplied from the tank, but in the operation of the valves of the filling station itself.

Figure 7:
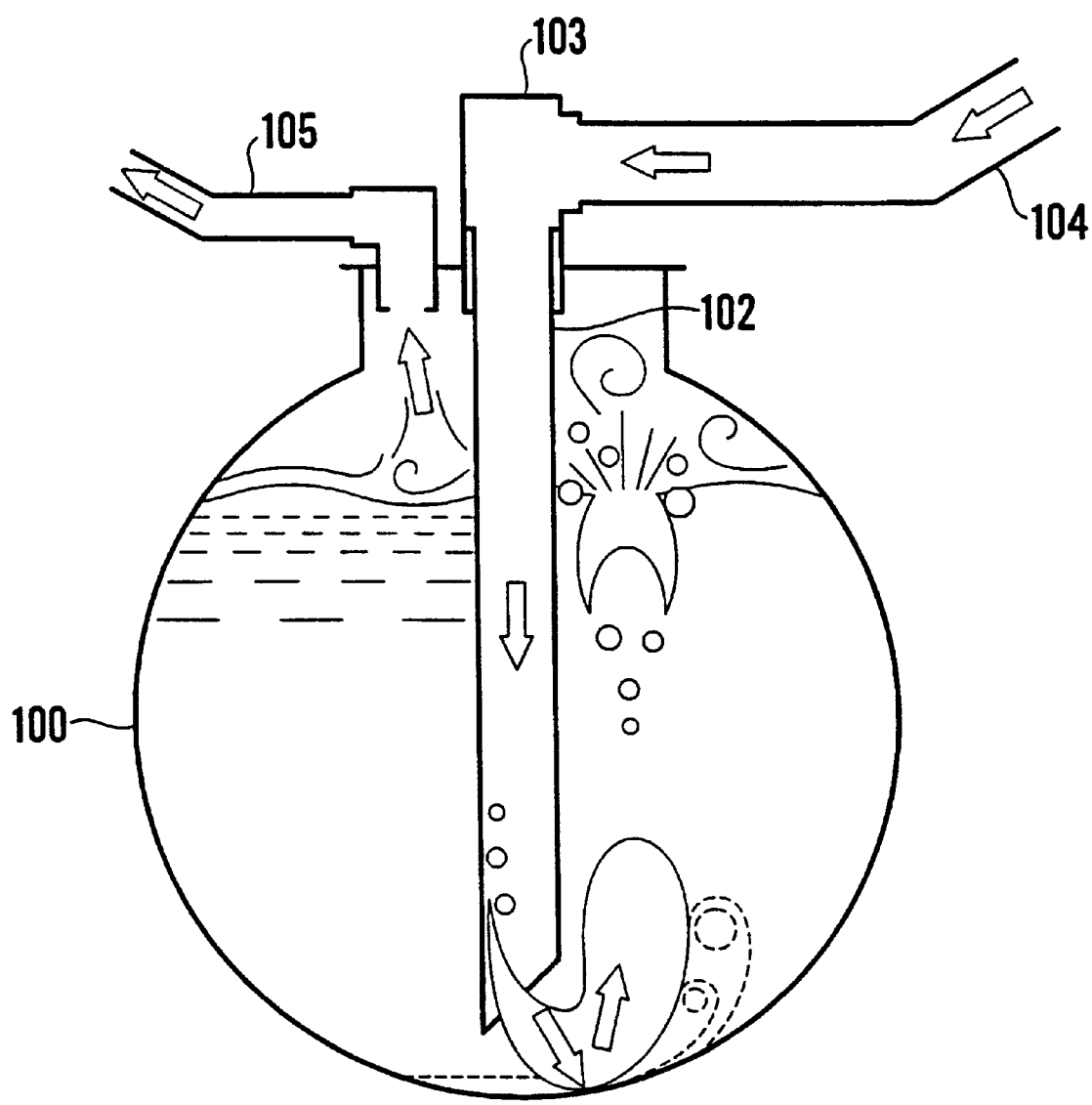
FIG. 7 is a view similar to FIG. 6, wherein the conventional fill or drop tube has been fitted with a diffuser in accordance with the invention.

Referring to FIG. 7, this shows the storage tank of FIG. 6 with the drop tube modified and fitted with a diffuser in accordance with the invention. Diffuser 106 is fitted to the end of the drop tube which is cut off at right angles to its axis rather than at an angle as in FIG. 7. The characteristic of the diffuser 106 is that it includes a closed off lower end 108 and a series of horizontal vanes 111, which promote laminar flow of fuel and air substantially at right angles to the axis of the drop tube. Preferably, the vanes extend around substantially the whole of the circumference of the diffuser, and the effect of the vanes is to break up the air pockets into smaller bubbles, and cause much reduced disturbance.

Figure 8:
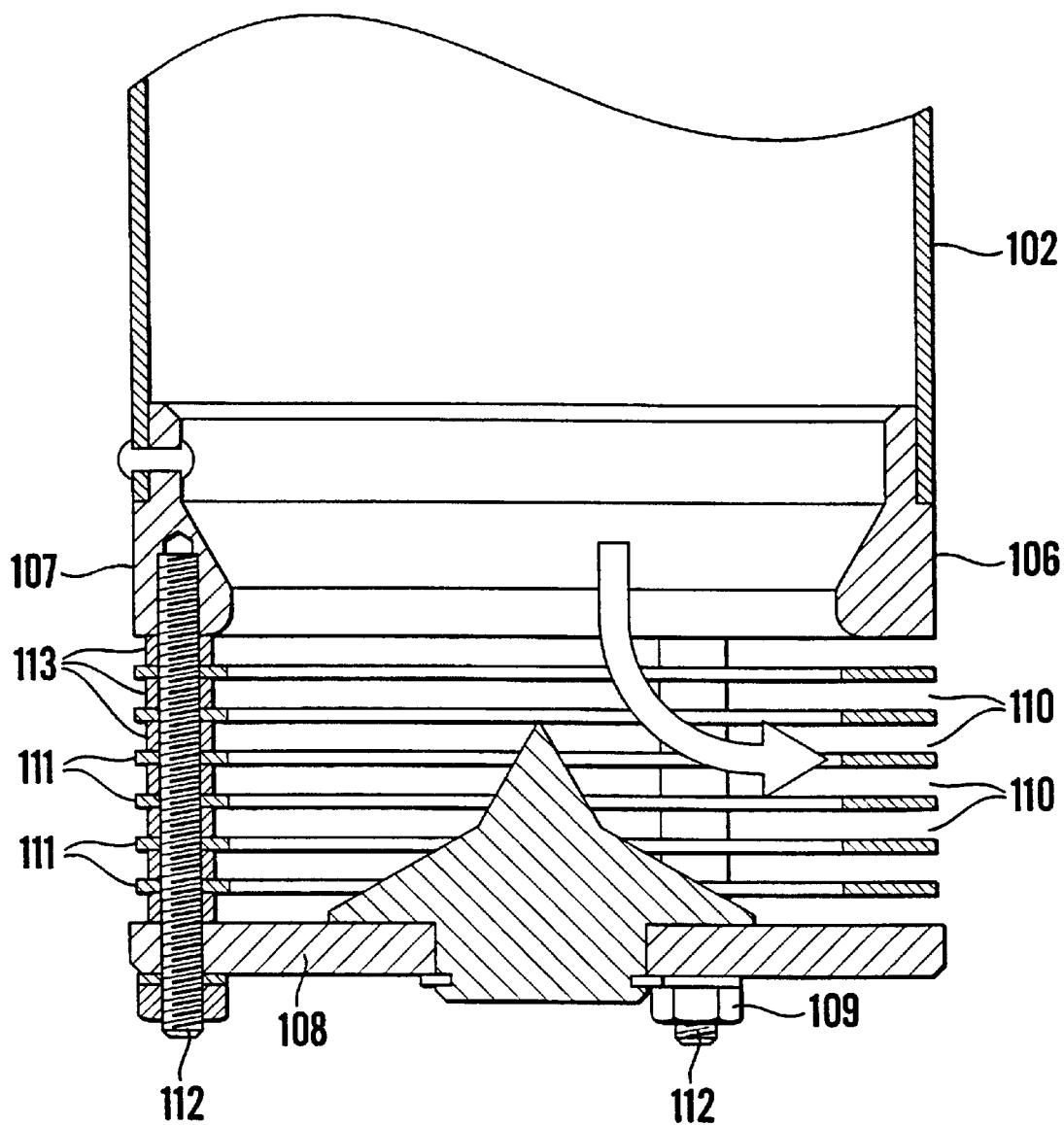
FIG. 8 is a section through a preferred embodiment of the diffuser in accordance with the invention.

The details of the construction of the diffuser are shown in FIG. 8.

The diffuser comprises a tubular part 107 attached to the lower end of the drop tube 102, and having a base 108 which carries a cone-shaped deflector 109. A series of slot-shaped apertures 110 are formed by a series of vanes 111, which are mounted on studs 112, screwed into the tubular part 107. Spacers 113 between the vanes 111 control the size of the slots 110.

Figure 9:
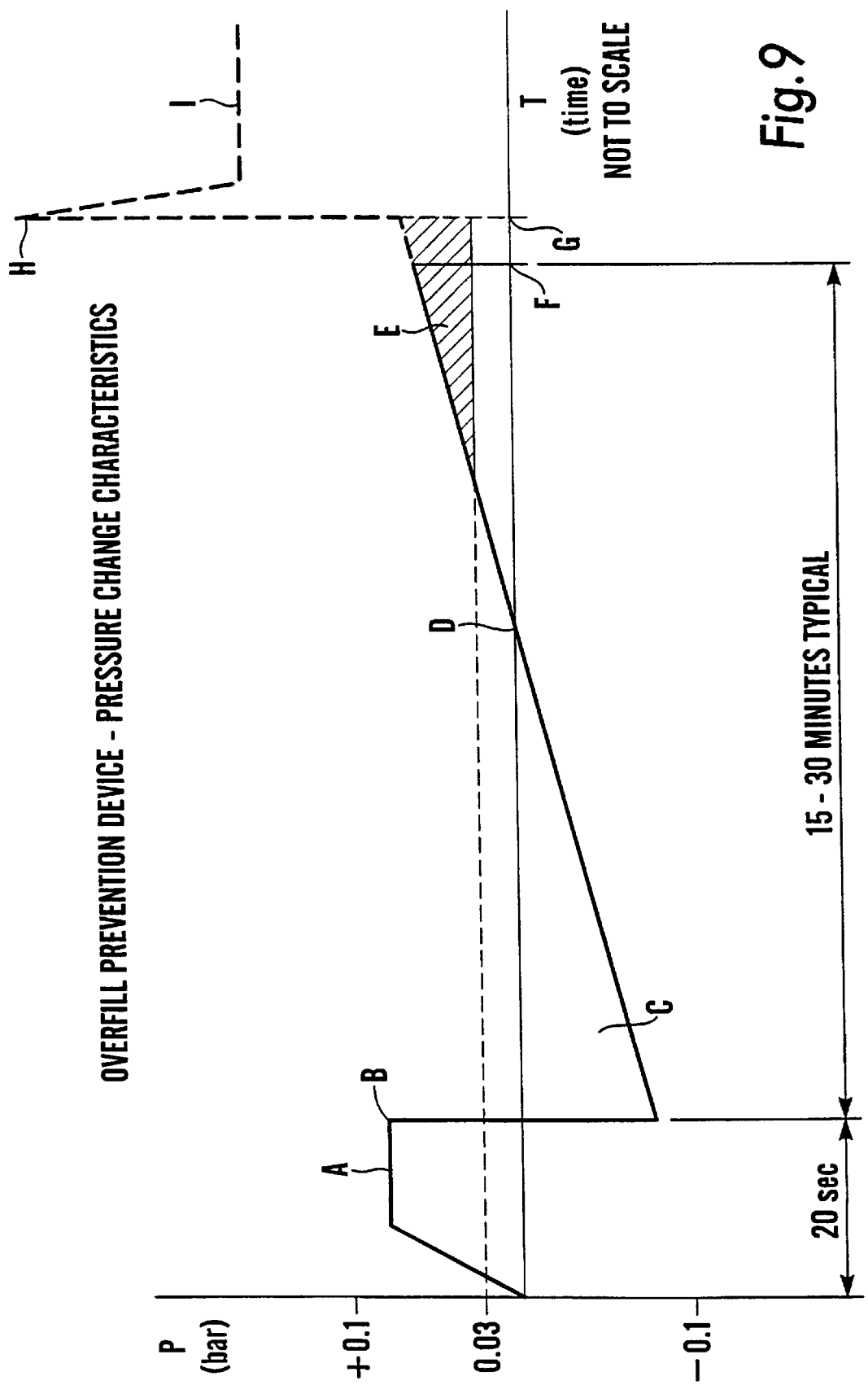
FIG. 9 is a graph showing the pressure changes during filling of the fuel storage tank.

FIG. 9 is a graph showing the pressure changes which occur within the T-piece 15 at various times after fuel delivery is commenced to a fuel storage tank fitted with an OPD in accordance with the invention.

At the start of the tank filing operation, air in the pipework leading to the T-piece 15 from the road tanker is compressed ahead of the advancing fuel slug. This is depicted as the area A in the graph during which the pressure in the T-piece commonly reaches a maximum of about 0.1 bar.

Approximately 20 seconds after the tanker has started delivering fuel, the compressed bubble or slug of air is displaced through the drop tube into the tank—see FIG. 4. As a result the pressure falls sharply as shown at point B. The pressure falls to a negative pressure of about –0.1 bar because of the siphon effect of fuel passing down the drop tube. As the tank fills the siphon effect is reduced and the pressure gradually rises along line C. At point D, the pressure changes to positive as the resistance pressure drop exceeds the diminished siphon effect.

As the tank approaches its full condition, the pressure rises to above 30 mbar. This is indicated by the shaded area E which is the area in which the OPD operates.

Point F indicates the usual finish of delivery of fuel below the safe working capacity of the tank.

Point G represents 95% of tank capacity. At this point, the OPD is actuated and the flow inertia causes a sharp pressure spike as the fill valve closes (point H), giving a visible kick to the tanker delivery hose.

Pressure then falls to the hydrostatic head difference between the tanker fuel level and the OPD. This is typically about 150 mbar and the pressure at the OPD remains at this point until the taker delivery valve is closed, whereupon the fill valve resets because the pressure in the fill line 16 falls and the spring 14 or 84 returns the piston to its original position.

What is claimed is:

1. A fuel storage tank (3) having an overfill protection device (OPD) for shutting off flow of fuel into the tank when the amount of fuel in the tank reaches an intended maximum fill level, said OPD including a fill valve (4) located in or connected to a fuel fill tube (5) and linked to a piston or diaphragm (6), which is displaceable in a chamber, said chamber communicating with an aperture (53) which is arranged to vent the chamber into the tank when said aperture is open to cause displacement of the piston or diaphragm and the consequential closure of the fill valve, said aperture being controlled by a vent valve which normally maintains said valve closed, but is linked to fuel level sensing means for sensing when the level of fuel in the tank reaches said intended maximum fill level and causing said vent valve to open.

2. A storage tank as claimed in claim 1 wherein said vent valve is a float valve (10) which is arranged to maintain said aperture closed until fuel in the tank reaches said intended maximum fill level, whereupon fuel in said tank actuates said float valve to cause the aperture to open and the piston to be displaced in the chamber.

3. A storage tank as claimed in claim 1 wherein the vent valve is electrically operated and is actuated by an electrical signal from said sensor when fuel in the tank reaches said intended maximum fill level.

4. A storage tank as claimed in 1 wherein the fill valve is linked to a piston which is movable in a cylinder.

5. A storage tank as claimed in claim 3 wherein the cylinder communicates with a tube which extends into an ullage space and carries a float which is movable in response to rising fuel level to open the aperture.

6. A storage tank as claimed in claim 5 in which the chamber communicates with the ullage via a conduit and said conduit includes a test valve which is normally closed, but on operation opens the conduit to the ullage and thereby closes the fill valve.

7. A storage tank as claimed in claim 1 wherein the fill valve is a butterfly valve.

8. A storage tank as claimed in claim 1 wherein the fill valve is a poppet valve.

9. A storage tank as claimed in claim 1 wherein the fuel fill tube has a lower open end which is fitted with a diffuser, said diffuser having apertures which cause fuel emitted from the fill tube to exit therefrom under substantially laminar flow conditions.

10. A storage tank as claimed in claim 9 wherein the diffuser comprises two or more substantially parallel plates disposed substantially at right angles to the longitudinal axis of the drop tube.

* * * * *